Sept. 21, 1965  M. H. ANDERSON  3,207,115

EXPLOSIVE-OPERATED ANCHOR ASSEMBLY

Filed June 17, 1963  10 Sheets-Sheet 1

INVENTOR
MURL H. ANDERSON
BY Gausewitz and Carr
ATTORNEYS

Sept. 21, 1965 M. H. ANDERSON 3,207,115
EXPLOSIVE-OPERATED ANCHOR ASSEMBLY
Filed June 17, 1963 10 Sheets-Sheet 2

INVENTOR
MURL H. ANDERSON
BY Gousewitz and Carr
ATTORNEYS

Sept. 21, 1965  M. H. ANDERSON  3,207,115
EXPLOSIVE-OPERATED ANCHOR ASSEMBLY
Filed June 17, 1963  10 Sheets—Sheet 3
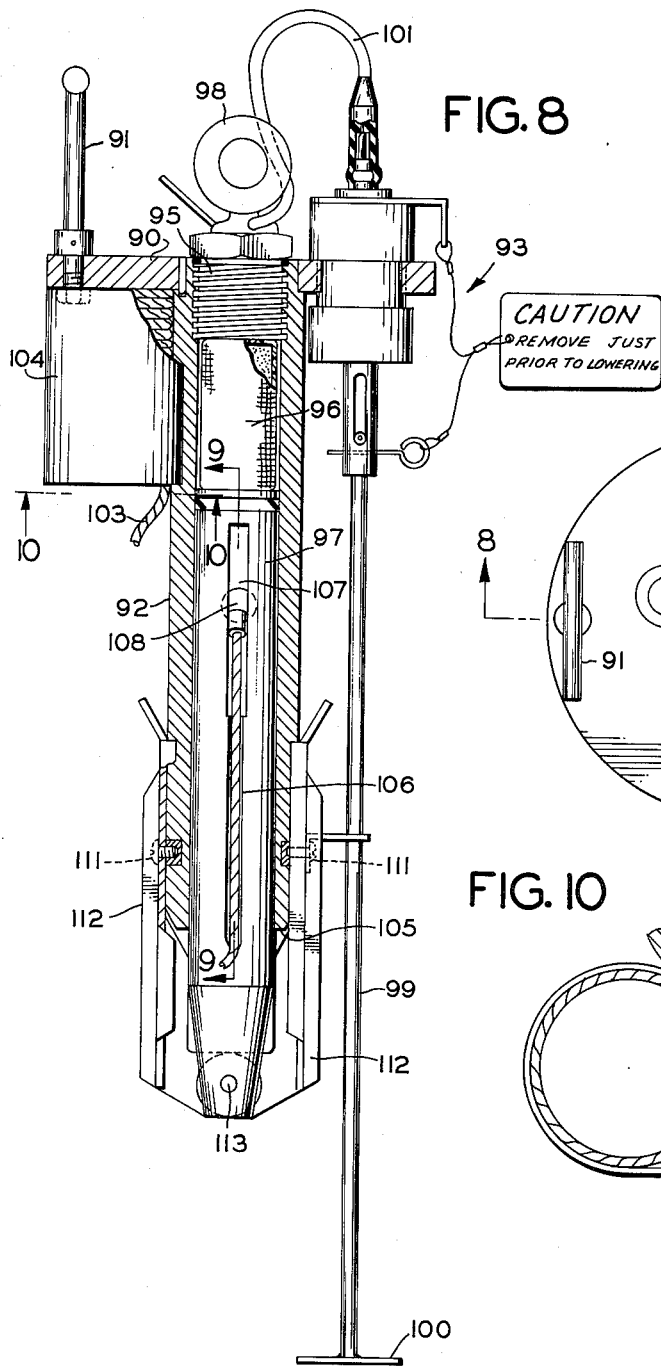
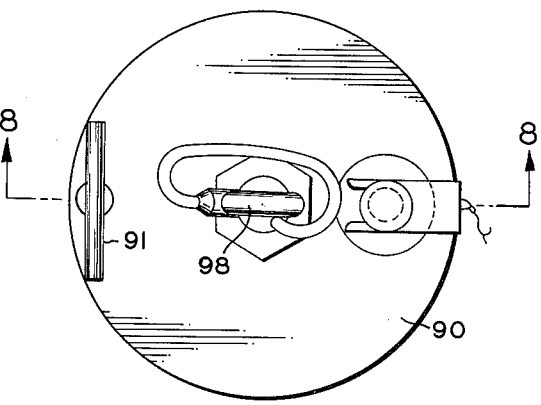
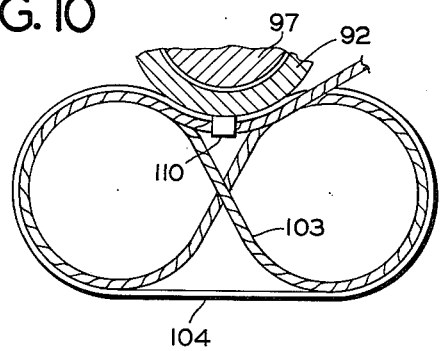
INVENTOR.
MURL H. ANDERSON
BY
ATTORNEYS Sept. 21, 1965  M. H. ANDERSON  3,207,115
EXPLOSIVE-OPERATED ANCHOR ASSEMBLY
Filed June 17, 1963  10 Sheets-Sheet 4

INVENTOR.
MURL H. ANDERSON
BY
ATTORNEYS

Sept. 21, 1965  M. H. ANDERSON  3,207,115
EXPLOSIVE-OPERATED ANCHOR ASSEMBLY
Filed June 17, 1963  10 Sheets-Sheet 5

INVENTOR.
MURL H. ANDERSON
BY
ATTORNEYS

Sept. 21, 1965    M. H. ANDERSON    3,207,115
EXPLOSIVE-OPERATED ANCHOR ASSEMBLY
Filed June 17, 1963    10 Sheets-Sheet 7

INVENTOR.
MURL H. ANDERSON
BY
ATTORNEYS

Sept. 21, 1965 M. H. ANDERSON 3,207,115
EXPLOSIVE-OPERATED ANCHOR ASSEMBLY
Filed June 17, 1963 10 Sheets-Sheet 8
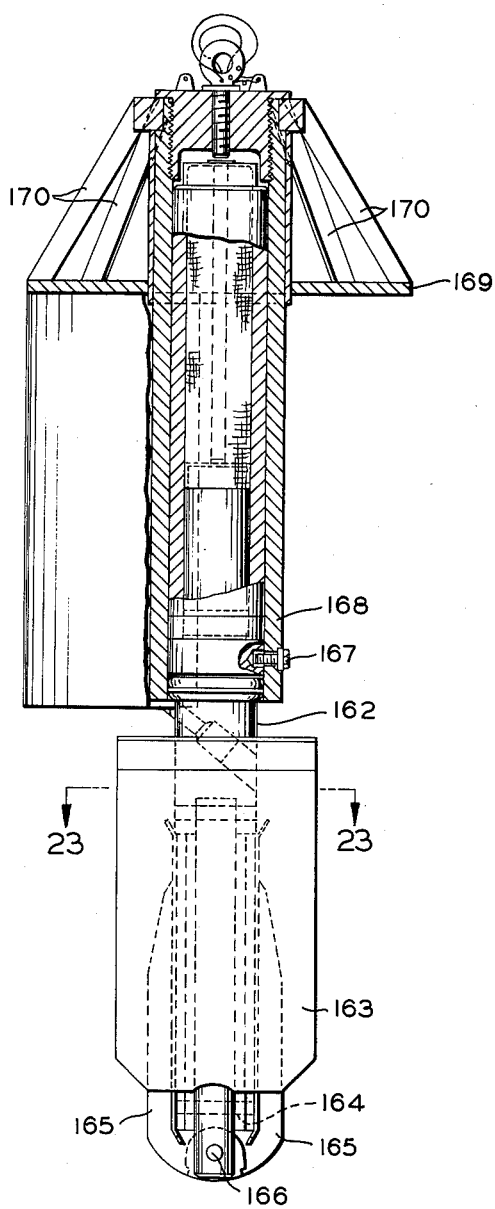
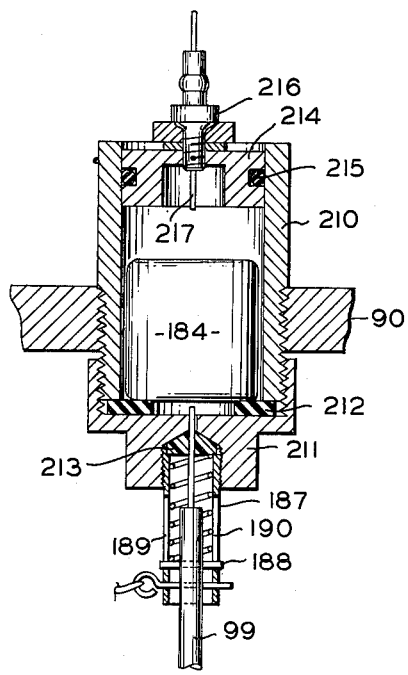
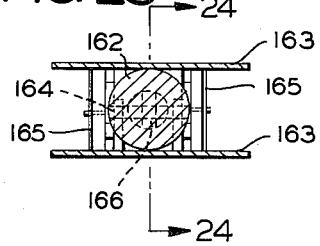
INVENTOR.
MURL H. ANDERSON
BY
ATTORNEYS Sept. 21, 1965        M. H. ANDERSON        3,207,115
EXPLOSIVE-OPERATED ANCHOR ASSEMBLY
Filed June 17, 1963                10 Sheets-Sheet 9

INVENTOR.
MURL H. ANDERSON
BY
ATTORNEYS

FIG. 27
FIG. 31
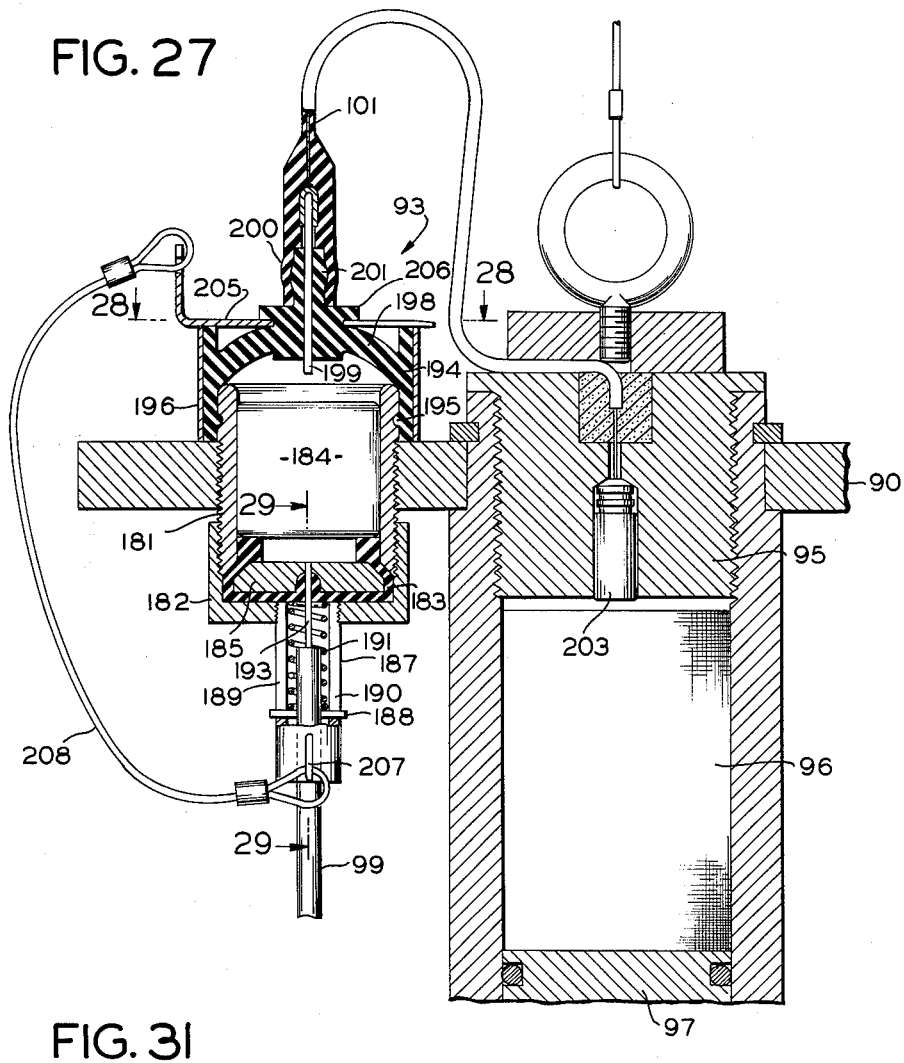
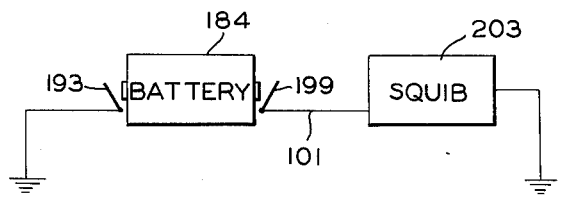
INVENTOR.
MURL H. ANDERSON
BY
ATTORNEYS

United States Patent Office 3,207,115
Patented Sept. 21, 1965

3,207,115
EXPLOSIVE OPERATED ANCHOR ASSEMBLY
Murl H. Anderson, Anaheim, Calif., assignor to Concept Engineering Co., Inc., Orange, Calif., a corporation of California
Filed June 17, 1963, Ser. No. 289,170
44 Claims. (Cl. 114—206)

This application is a continuation-in-part of my copending application for Explosive-Operated Anchor Assembly, Serial No. 276,633, filed April 29, 1963, and now abandoned.

This invention relates to an explosive-operated anchor assembly.

An object of the invention is to provide a highly effective, practical, safe, economical, lightweight and simple explosive-operated anchor assembly adapted to be employed for various purposes including the anchoring of boats under emergency conditions, the securing of submarine cables to the floor of an ocean or other body of water, and the launching of landing craft.

A further object is to provide an explosive anchor assembly wherein the relatively economical and small inner or piston component is the only one which may not be retrieved after use, the relatively expensive outer component being readily recoverable.

An additional object is to provide an explosive anchor assembly wherein means are provided to secure the cable to the projectile (piston or plunger) portion of the assembly in such manner that there will be substantially no damage to the cable upon explosion of the charge, and no damage of the cable due to kinking thereof following the explosion.

A further object is to provide an explosive anchor wherein portions of the cable are flaked behind the flukes of the anchor, and incorporating means to release the flukes and thus the flaked cable portions automatically upon explosion of the charge.

An additional object is to provide an explosive anchor the pivotal fluke portions of which are shaped with planing surfaces adapted to maintain the flukes closely adjacent the piston or plunger during projection through the water, and to open the flukes upon subsequent application of tensile forces to the anchor cable.

An additional object is to provide a combination cable and anchor secured together by a pivotal connection which is so located that pulling on the cable enhances the anchoring operation subsequent to firing, the cable portion adjacent the pivotal connection being disposed in a groove in order to permit telescoping of the projectile or piston portion of the anchor into the barrel portion thereof.

Another object is to provide a highly effective fuze assembly of the electrical type, said assembly incorporating fluid pressure-responsive means to arm the fuze when it is below a predetermined water depth but not otherwise.

Another object is to provide a method of anchoring a submarine cable to the floor of a body of water.

A still further object of this invention is to provide an explosive anchor that includes an arrangement for accelerating the anchor cable along with the projectile to avoid imposing shock loads on the cable.

Yet another object of this invention is to provide an embedment anchor having a means to produce an opening in the bottom of the body of water through which the cable passes as the anchor penetrates for protecting the cable from damage.

Another object of this invention is to provide a cable retaining arrangement in which the cable is wound in a figure eight pattern and held in an open bottomed container.

An additional object of this invention is to provide an embedment anchor having flukes that open up when tension is applied to the anchor, and are prevented from overtravel rotationally by locking surfaces.

Another object of this invention is to provide an explosive anchor in which the projectile has a long stroke within the barrel for efficient utilization of the energy of the propulsive gases.

A further object of this invention is to provide an explosive anchor in which the projectile has a long stroke within the barrel, the cable is accelerated with the projectile, and the pull on the embedded anchor is from the upper portion of the anchor.

An additional object of this invention is to provide an explosive anchor in which the projectile portion is made up of more than one component to allow the cable initially to be attached relatively low on the projectile beneath the end of the barrel, and subsequently upon embedment to engage and pull upon an upper portion of the projectile.

These and other objects and advantages of the invention will be more fully set forth in the following specification and claims, considered in connection with the attached drawings to which they relate.

In the drawings:

FIGURE 7 is a top plan view of a modified form of the explosive anchor assembly of this invention;

FIGURE 8 is a longitudinal sectional view, partially in elevation, taken along line 8—8 of FIGURE 7;

FIGURE 10 is a fragmentary transverse sectional view taken along line 10—10 of FIGURE 8, illustrating the means for retaining the anchor cable;

FIGURE 16 is a side elevational view, partially in section, of a different projectile unit;

FIGURE 22 is a side elevational view, partially in section, of an anchor assembly particularly suitable for construction in larger sizes;

FIGURE 23 is a transverse sectional view showing the arrangement of the flukes on the unit of FIGURE 22;

FIGURE 27 is a longitudinal sectional view of a simplified arrangement for the fuze and explosive charge;

FIGURE 31 is a wiring diagram of the circuit for exploding the charge; and

FIGURE 32 is a longitudinal sectional view of a different form of the fuze assembly.

Figure 1:
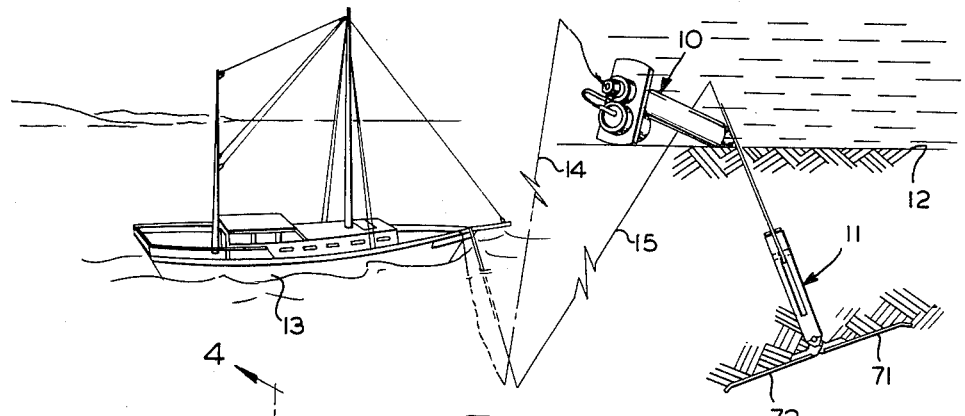
FIGURE 1 is a schematic perspective view illustrating the relationship between a vessel and the two components of the explosive-anchor assembly, one of the components being shown on the floor of a body of water and the other of the components being shown as embedded in such floor.

Stated generally, the anchor apparatus of the invention comprises a retrievable outer assembly 10 and an irretrievable inner assembly 11, it being a feature of the invention that the irretrievable assembly is small and inexpensive so that the inability to recover the same is not an important factor. In FIGURE 1, the outer assembly 10 is illustrated as resting on the ocean floor 12, prior to being drawn up to a floating vessel 13 by means of a suitable light line indicated at 14. The inner assembly 11, on the other hand, is illustrated as fully embedded in the ocean floor, being connected to the vessel by means of an anchor cable 15 which must be cut before the vessel is released.

Proceeding first to a description of the outer assembly 10, this comprises an elongated barrel or housing 17, a drag plate 18 mounted transversely of the upper end of the barrel, and a fuze assembly 19 mounted in an opening in the drag plate adjacent the upper barrel end.

Figure 3:
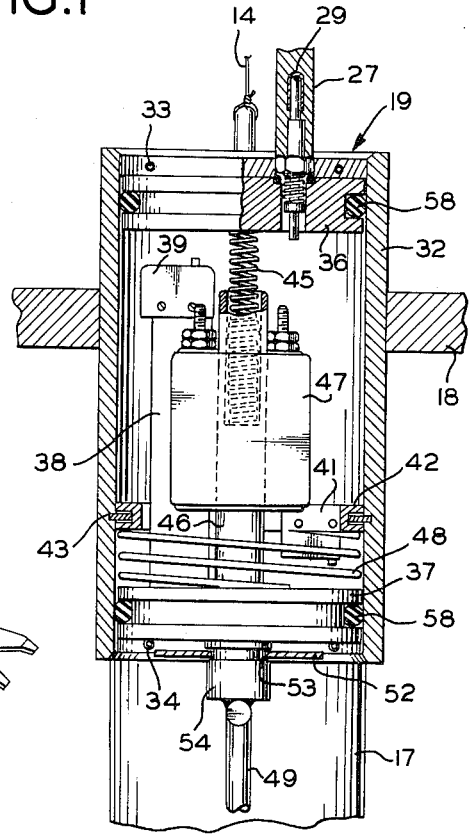
FIGURE 3 is an enlarged fragmentary longitudinal sectional view taken on line 3—3 of FIGURE 2, illustrating the fuze portion of the apparatus.
Figures 4, 5:
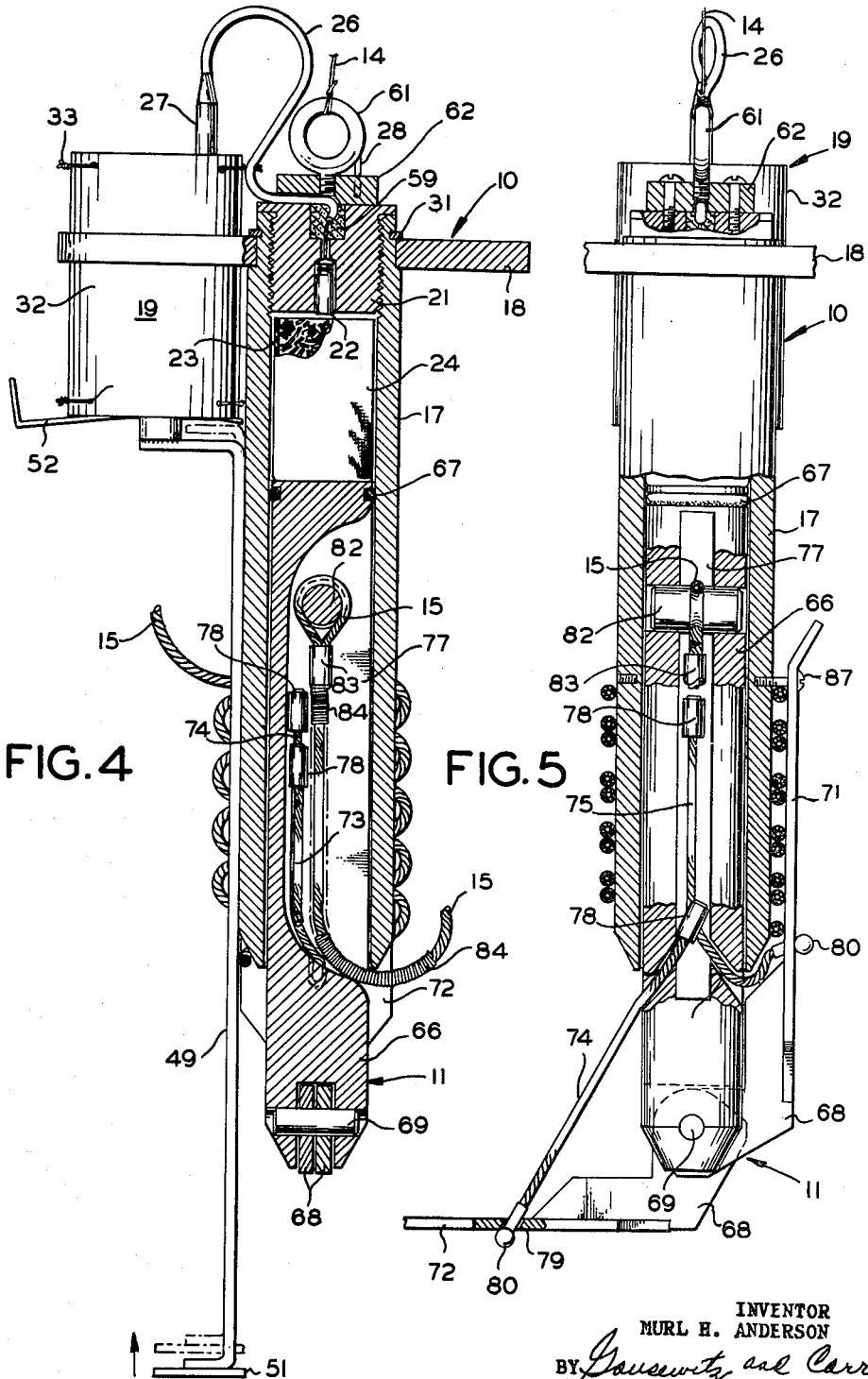
FIGURE 4 is a longitudinal section taken on line 4—4 of FIGURE 2.
FIGURE 5 is a corresponding view, primarily in section, taken at a right angle to the showing of FIGURE 4.
Figure 11:
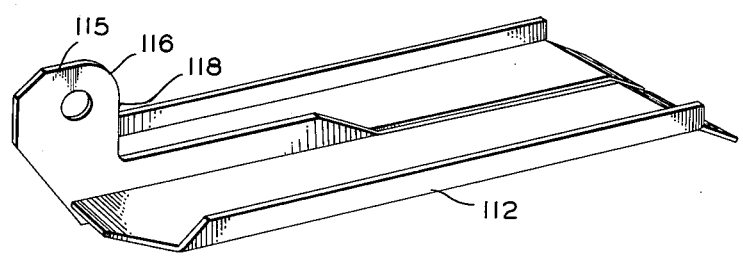
FIGURE 11 is a perspective view of one of the flukes removed from the projectile assembly.

Barrel 17 comprises a steel tube beveled at its lower end, which may be termed the mouth, and internally threaded at its upper end to receive the breech element 21 best shown in FIGURE 4. The breech element contains a squib or detonator 22 adapted to ignite the powder 23 in a plastic canister 24, the latter being seated between the breech and the extreme inner end of the assembly 11 to be described subsequently. The squib is electrically connected to a lead 26 having a jack 27 at its outer end for connection either to a grounding pin 28 on the breech, or to a connector plug 29 (FIGURE 3) on the fuze assembly 19.

The drag plate 18 seats over the upper end of barrel 17 and against a shoulder portion thereof, being secured in position by a snap ring 31. The drag plate is sufficiently large to provide an action in the nature of a parachute, insuring that the assembly will be in the downwardly-pointing position shown in FIGURES 2–5 when the ocean floor 12 is engaged. The plate also serves the purpose of providing reaction sufficient to prevent excessive movement of the retreivable outer assembly 10 upon detonation of powder 23.

The fuze assembly 19 comprises a cylindrical or tubular housing 32 which is suitably welded, brazed or otherwise secured in an opening in drag plate 18, parallel to the barrel 17. Mounted in the upper and lower ends of the housing 32 are end wires 33 and 34 which perform the safety function of preventing removal of upper and lower pistons 36 and 37. Such wires serve as seals to prevent tampering with the contents of the fuze assembly, so that there is no danger of accidental closing of the switches which are contained therein as will next be described.

The lower piston 37 is provided with an upwardly-extending elongated bracket 38 which supports a first normally-open switch 39 in position to be engaged and closed by upper piston 36 after substantial downward movement thereof. A second normally-open switch 41 is fixedly positioned in the housing 32 above the lower piston, in position to be engaged and closed thereby after the lower piston moves upwardly a predetermined distance. Second switch 41 may be mounted by means of an internal bracket 42 which is locked in position by an internal snap ring 43.

Downward movement of the upper piston is resisted by means of a relatively weak helical compression spring 45 which is seated between the upper piston and the upper end of a spacer member 46, the latter extending upwardly from the lower piston coaxially of the housing. The spacer member 46 also serves to mount one or more batteries 47 adapted to energize the squib 22.

A relatively strong helical compression spring 48 is seated between the internal bracket 42 and the lower piston 37. Such spring is sufficiently strong that normal water pressures are resisted thereby, so that firing does not occur until a firiing rod 49 engages the ocean floor 12. The firing rod extends downwardly along barrel 17, being secured to a bottom-engaging plate 51 which is located a substantial distance beneath the lowermost part of inner assembly 11.

It is pointed out that the firing rod 49 may not move upwardly until after manual removal of a bifurcated safety clip 52 which is mounted adjacent the lower end of housing 32 as indicated in FIGURES 3 and 4. The fork portions of the safety clip extend along opposite sides of the bottom of an annular groove 53 in a connector 54 (FIGURE 3) mounted on the lower piston, and to which the upper end of firing rod 49 is secured.

The strength of spring 45, and the distance between upper piston 36 and switch 39, are so adjusted that water pressure will not force the upper piston 36 into operative engagement with switch 39 until the apparatus is at a safe depth beneath the surface. Thus, for example, if the anchor is dropped into excessively shallow water, such as less than ten feet, it will not operate and possibly create adverse effects relative to the vessel 13 and its occupants.

Figure 6:
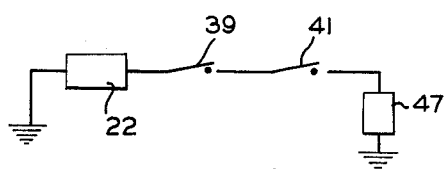
FIGURE 6 is a schematic wiring diagram of the apparatus.

After the anchor is at a safe depth sufficient to effect closing of switch 39 by upper piston 36, engagement of bottom plate 51 with the ocean floor 12 causes upward shifting of lower piston 37 until switch 41 is engaged and closed. As indicated schematically in FIGURE 6, the switches 39 and 41 are in series with each other and with the battery 47 and squib 22. Accordingly, closing of the switch 41 completes the circuit and fires squib 22 to ignite powder 23.

It is pointed out that engagement of rod 49 with ocean floor 12, with consequent upward movement of piston 37, will not effect opening of switch 39 despite the fact that piston 36 is connected to piston 37 through rod 46 and spring 45. This is because switch 39 is mounted to bracket 38 on piston 37, and therefore moves upwardly with piston 37 after the ocean floor is engaged.

The described fuze assembly is highly safe, not only because of the pressure-responsive upper piston 36 but also because the previously-described bifurcated clip 52 prevents undesired movement of the firing rod 49 and lower piston 37. This clip 52 is not removed until the anchor is over the side of the boat and ready to be lowered. Furthermore, the jack 27 is not mounted on the associated plug 29 until the anchor is over the side of the boat, being previously mounted upon the grounding pin 28 which insures that the squib 22 is normally grounded and thus in safe condition.

It is to be understood that various leads, not shown, are provided within the fuze housing 32 to associate the switches, battery, etc. It is also to be understood that the various electrical components are sealed against entrance of water, for example by the O-rings 58 associated with pistons 36 and 37, and by epoxy resin 59 which prevents leakage around lead 26 into the squib 22.

It is a feature of the invention that the inner or projectile assembly 11, which is irretrievable, is connected directly through cable 15 to the vessel 13, independently of the outer assembly. It is therefore possible to retrieve the relatively expensive outer assembly 10 (including the fuze assembly 19) by use of the light line 14, the latter being shown as connected to a ring 61 (FIGURES 4 and 5) which is screwed into a cover plate 62 on breech 21. It is to be understood, however, that in some operations, as in extremely deep water where use of two lines may be undesirable, the line 14 may be omitted and the assembly 10 connected in series with the inner assembly 11, so that it is no longer possible to recover assembly 10.

The inner assembly 11 comprises a cylindrical piston, plunger or projectile 66 which fits slidably in the barrel 17. The piston is sufficiently long that its inner end will be disposed closely adjacent the bottom of powder canister 24 as shown in FIGURE 4, while its outer and beveled end or nose is disposed a substantial distance beneath the beveled mouth of barrel 17. An O-ring 67 is mounted at the inner end of piston 66 to prevent escape of gas therearound when the powder is ignited.

Pivotally mounted at the downwardly-projecting lower end or nose of piston 66 are two bell crank-shaped hinge elements 68. Such elements are disposed in planes which are located adjacent and parallel to the axis of the piston. The inner ends of hinge elements 68 are disposed in a slot or notch in the lower piston end, being pivotally associated therewith by means of a hinge pin 69 which is fixedly secured in a transverse bore through the piston. Welded to the outer portions of the hinge elements 68 are a pair of flukes 71 and 72 having sufficient size to lock the inner assembly 11 in the ocean bottom 12 (FIGURE 1) despite the presence of very substantial tensile forces in cable 15. As best shown in FIGURE 5, the flukes may be pivoted between a first position (shown relative to fluke 71) parallel to and closely adjacent barrel 17, and a second position (shown relative to fluke 72) perpendicular or transverse to such barrel. When in the first position, the flukes lie in planes parallel to and spaced from the axis of the piston 66. When in the second position, the flukes lie in planes perpendicular to such axis.

First and second short fluke-retaining cables or stays 73 and 74 are respectively associated with flukes 71 and 72 to retain the same in their second or locking position. The cables 73 and 74 extend slidably through oblique bores 75 which are formed in piston 66 outwardly adjacent the mouth of barrel 17. The bores 75 communicate with a groove 77 which is formed in the piston 66 for the majority of the length thereof, extending from a point just beneath the barrel mouth to a point relatively adjacent O-ring 67. Groove 77 has parallel walls disposed on opposite sides of the axis of the piston, such walls being spaced sufficiently far apart to provide clearance for a portion of cable 15 which is disposed in the groove.

The ends of the short stays or cables 73 and 74 which are disposed in groove 77 are provided with spools 78 which prevent their withdrawal through the oblique bores 75. The opposite or outer ends of the short cables extend through openings 79 in flukes 71 and 72, being associated with ball-like fittings 80 which prevent passage of the cable ends through such openings 79. When the flukes are in their first position, shown relative to fluke 71 in FIGURE 5, the associated short cables are pulled into the groove 77. Upon outward pivoting the flukes to position shown relative to fluke 72 in FIGURE 5, the short cables are drawn through the bores 75 until further movement is prevented by spools 78.

The manner of association of cable 15 with piston 66, and also with flukes 71 and 72, is of extreme importance to the present invention. Stated generally, a substantial length of cable is flaked in a predetermined manner between the flukes and barrel 17, and connector means are provided to maintain this flaked relationship and also to maintain the piston 66 in a predetermined rotated relationship relative to the barrel. Furthermore, and very importantly, the extreme end portion of cable 15 is return bent into groove 77 and connected to piston 66 at the end portion thereof remote from hinge means 68. Such manner of connection insures that tension present in cable 15 after projection of the assembly 11 into the ocean floor will not effect cocking of the barrel. Instead, the barrel will stay in alignment with the direction of the tension so that the flukes 71 and 72 remain in positions for maximum anchoring effectiveness.

Stated in greater detail, the extreme end of the cable is bent around a pivot or anchor pin 82 and is secured in position by a sleeve or fitting 83. Pivot pin 82, which is suitably grooved to receive the cable or a suitable thimble therefor (not shown), extends through a bore which is provided in piston 66 perpendicular to the groove 77. From pivot pin 82, the cable end portion extends downwardly longitudinally through groove 77 and outwardly beneath the beveled mouth of barrel 17, as shown in FIGURE 4.

The end portion of the cable is protected from the whipping and frictional action of the water by means of a tightly wound helical spring 84 or other suitable protector element. Such spring protects the cable from becoming frayed or damaged due to the enormous forces which are present when the cable end is suddenly whipped or pivoted from the illustrated position to a position extending longitudinally of the piston 66 and upwardly therefrom. When in such upwardly-extending position, the cable end portion seats on a rounded end of groove 77, at the upper-right portion of such groove as viewed in FIGURE 4.

Figure 2:
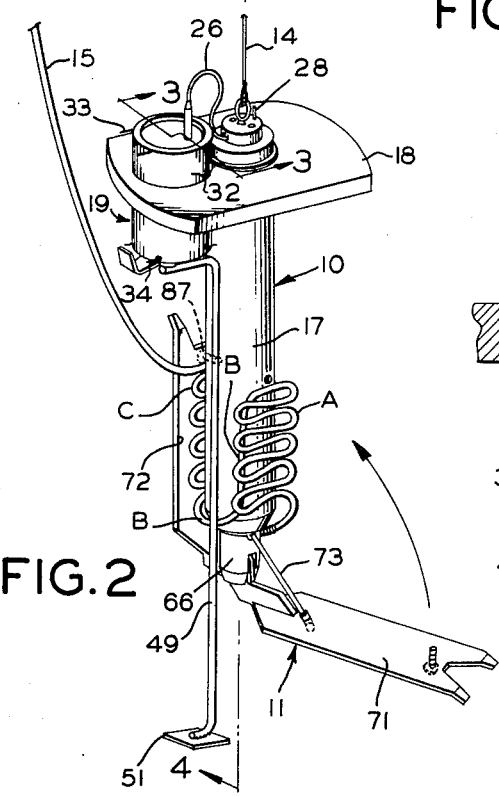
FIGURE 2 is a perspective view illustrating the explosive-anchor assembly in substantially fully assembled condition.

Referring to FIGURE 2, the cable portion adjacent the described end is flaked in an upward direction on one side of barrel 17, is then extended downwardly to a position adjacent the other side of the barrel, and is then flaked in an upward direction until the main body (or upwardly-extending free portion) of the cable 15 is reached. The term "flaked" as herein employed denotes the generally sinusoidal relationship shown in the drawing, particularly when the sine wave is axially compressed. The portion of cable 15 which is flaked on one side of barrel 17 is indicated at A in FIGURE 2, the downwardly-extending portion which connects the flaked portions on both sides of the barrel is shown at B, and the flaked portion on the opposite of the barrel is represented at C.

Cable portions A and B lie generally in planes which are parallel to that of grooves 77 and are disposed on opposite sides thereof. Furthermore, the downwardly-extending portion B is located on the opposite side of piston 66 from the groove 77. It follows that firing of the projectile or piston 66 does not effect kinking, twisting or fouling of the cable. It is to be understood that the flaked or shortened cable portion is sufficiently long to permit the projectile or inner assembly 11 to embed itself in the ocean bottom 12 without being impeded by the main body of the cable.

The means to maintain the cable flaked behind the flukes, and to maintain piston 66 in proper rotated condition such that groove 77 is parallel to the planes of the flaked portions A and C, comprise two screws 87 which are threaded through the ends of the flukes and into the barrel 17. It is to be understod that tightening of the screws effects clamping of the flaked cable portions against the side of the barrel. However, upon ignition of powder 23 the screws are sheared off to free the flaked cable portions and the entire inner assembly 11. It is pointed out that the screws 87 also maintain the piston in proper longitudinal position in the barrel.

The free ends of the flukes are formed with bifurcated planing portions which are bent obliquely to the barrel, and provide two results. In the first place, such portions maintain the flukes relatively closely adjacent and parallel to the piston 66 after ejection thereof from the barrel, so that resistance to embedment into the ocean floor is minimized. In the second place, such planing portions effect outward pivoting of the flukes to the open position shown in FIGURE 1 when the cable 15 is pulled after embedment of inner assembly 11.

The anchor is prepared for use by positioning the short cables or stays 73 and 74 in the bottom of groove 77, inserting piston 66 into barrel 17, flaking the cable portions A and C behind the flukes 71 and 72 as described relative to FIGURE 2, and inserting the screws 87 through the flukes and into barrel 17. To prevent fouling of the cable 15, the short cables or stays 73 and 74 are nested beneath the cable section which is disposed in groove 77 and covered by protector 84.

A canister 24 of powder 23 is inserted in the barrel after removal of breach 21, the jack 27 then being disposed on grounding plug 28 to insure against ignition of the squib 22. The fuze assembly 19 is then in the condition shown in FIGURE 3, the bifurcated latch element 52 being in position to prevent accidental closing of switches 39 and 41.

When it is desired to use the anchor, it is lowered over the side of vessel 13 by means of the line 14 and cable 15, following which the jack 27 is removed from grounding pin 28 and mounted on plug 29 as shown in FIGURE 3. Furthermore, the latch element 52 is manually removed.

The anchor is then lowered into the water, with the drag plate 18 acting in the manner of a parachute to maintain the firing rod 49 in downwardly-pointed direction. After the anchor reaches a predetermined depth, the fuse assembly 19 becomes conditioned to ignite the squib 22 and thus powder charge 23 as soon as the bottom plate 51 engages the ocean floor 12, all as described above in detail.

Ignition of the powder charge effects ejection of the piston 66, shearing of screws 87, and embedding of the assembly 11 in the ocean floor to a substantial depth. Subsequent pulling upon the cable 15 then causes the flukes to open to the position of FIGURE 1 and create a very large resistance to withdrawal of the anchor. The assembly 10, which remains relatively stationary during the explosion due to operation of drag plate 18, may be retrieved by merely drawing in the line 14.

The assembly has many uses, such as the emergency anchoring of boats, and the launching of military landing craft from the beach. For example, to anchor a submarine cable to the ocean floor, two of the described anchor assemblies are lowered by means of lines 14 on opposite sides of the submarine cable. The anchor cable 15 does not then extend to the vessel but instead extends between the portions 11 of the two anchor assemblies which are thus lowered. The anchor assemblies are then ignited so that they embed themselves in the ocean floor on opposite sides of the cable. It follows that the cable 15 (which is relatively short) extends over the submarine cable and prevents substantial shifting thereof, much in the nature of a giant staple.

The basic design of this invention may be varied appropriately to suit particular conditions. The version illustrated in FIGURES 7, 8, 9 and 10, as before, includes a drag plate 90, equipped in this instance with a vertically projecting T-handle 91 to facilitate handling. A barrel 92 and a fuse assembly 93 are carried by the drag plate 90. The breeech 95 threads into the upper end of the barrel above the explosive charge 96, that in turn is adjacent the inner end of the projectile 97. An eyebolt 98 extending upwardly from the breech is adapted for attachment with the relatively light cable utilized in retrieving the major portion of the unit following the embedment of the anchor in the floor of the body of water. Rod 99 includes a foot 100 at its bottom end for engagement with the floor, which moves the rod upwardly to complete the circuit at the fuse, transmitting current through conductor 101 to the squib at the breech. The details of the fuse carried by the drag plate 90 are explained below.

Figure 9:
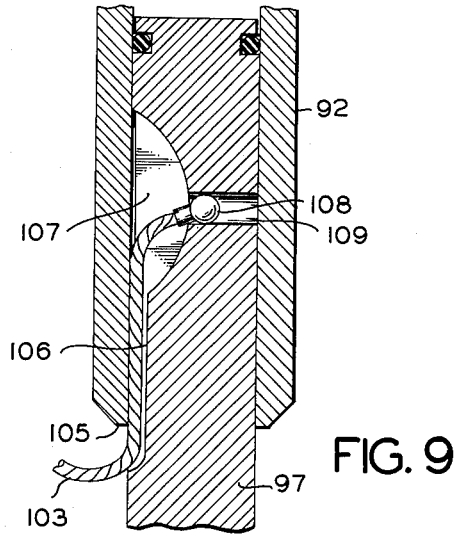
FIGURE 9 is an enlarged fragmentary sectional view taken along line 9—9 of FIGURE 8, showing the attachment of the cable to the projectile.

Instead of being flaked behind the flukes of the anchor as in the previously described embodiment, the anchor cable 103 is disposed immediately underneath the drag plate 90 and located within a light sheet metal housing 104. The latter member has an open bottom from which the end portion of cable 103 extends, passing beneath the bottom end 105 of the barrel and upwardly inside the barrel in a longitudinally extending groove 106 formed in the wall of the projectile 97. This recess, as may be seen in FIGURE 9, is relatively shallow, but is of a sufficient depth to entirely receive the cable. The distal end of the cable passes through a deeper slot 107 that extends radially into the circumferential wall of the projectile 97. A ball end 108 attached to the cable is received with a cylindrical opening 109 that connects to recess 107, being captured in this manner because it is wider than the lateral dimension of slot 107. By this arrangement the cable is connected to the upper end portion of the projectile inwardly of the bottom end 105 of barrel 92, and the projectile can slide freely within the barrel.

The cable 103 within the container 104 is wound back and forth along the curvilinear end wall portions of the container, crossing over the form a figure eight pattern. As a result, the successive turns are in adjacent relationship and superimposed one above the other. Moreover, no twist is imparted to the cable as might occur, for example if the cable were wound into a helical coil. The two turns of the figure eight winding cancel out all twist. A light inwardly bent tab 110 engages the lower portion of the cable, holding the cable within the open bottomed housing 104 when the unit is in the vertical position of FIGURE 8.

Upon explosion of the powder charge 96, therefore, the projectile 97 is driven downwardly and out of the barrel 92. This, through the ball end 108 of the cable, causes the cable to be pulled along with the projectile as the anchor moves toward the bottom. As in the previously described arrangement, the screws 111 passing through the flukes 112 and into the outer wall of the barrel, act as shear pins, allowing the projectile to commence its movement only upon generation of a predetermined amount of pressure within the barrel. This also releases the flukes 112 so that they can move outwardly after the unit has been embedded in the bottom to secure the anchor in place. Upon embedment of the anchor, the cable 103 pulls upon the top portion of the anchor at opening 109, assuring that the flukes can open properly and that there will be no bodily rotation of the anchor unit as a consequence of the forces imposed by the cable. Hence, the projectile 97 has a relatively long stroke within the barrel, yet ultimately the forces are applied at the upper end of the projectile after the anchor has been fired into the bottom.

As the projectile moves downwardly, the cable 103 is pulled smoothly and evenly from the container 104. By being wound progressively in the figure eight pattern and located horizontally with respect to the unit the cable is pulled from the housing substantially at a uniform velocity. Hence, once the cable starts its movement there is no sudden acceleration of a portion of the cable as it leaves the housing, which thereby avoids shock loads and prevents breakage of the cable. The absence of twist in the cable assures that it will not snarl as it unwinds, and also helps preclude cable damage or breakage. This arrangement for the cable, therefore, retains all the advantages enumerated for the sinusoidal flaking as used in the previous described embodiment. It has the additional feature of retaining the cable accurately in place despite handling of the anchor unit prior to its actual use, so that the cable will not become damaged and that the winding patern will not become disturbed. Also, the construction of the housing 104 with its curved end wall portions facilitates the winding of the cable into the figure eight pattern. Therefore, it becomes simpler to arrange the cable with the anchor, and there is greater assurance of reliable operation upon use of the anchor.

Figure 13:
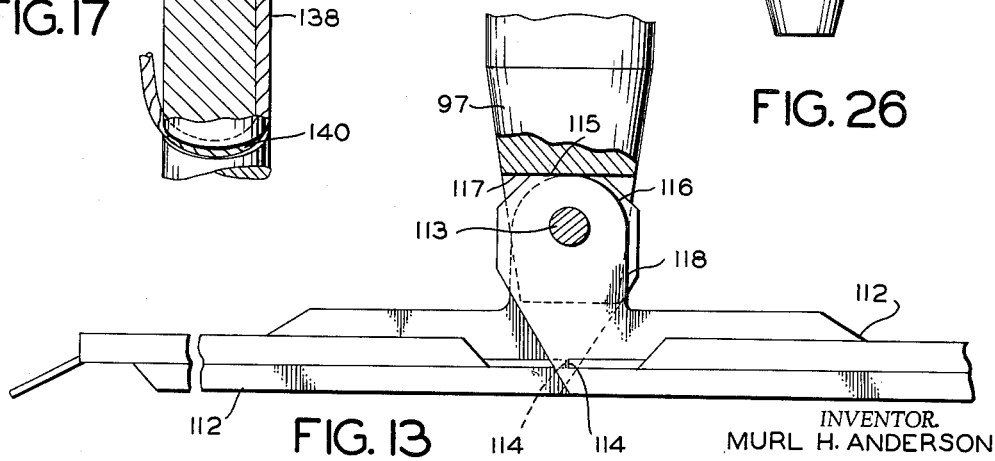
FIGURE 13 is a view similar to FIGURE 12 with the flukes opened up.

This arrangement of the invention also avoids the use of the short cables or staves 73 and 74, described above, to prevent overtravel of the flukes once they open out as the load is applied to the embedded anchor. Instead, rotation is limited both through a locking hinge construction and by interengagement of the two flukes. This has the advantage of allowing completely free rotation of the flukes without possibilty of restriction as might occur from the short staves 73 and 74. According to the present arrangement, adjacent the pivot pin 113 the flukes include laterally projecting edges 114. These surfaces are aligned with the axis of pin 113 such that upon rotation of both flukes through approximately ninety degrees the edges 114 are brought into contact with each other, and the flukes can pivot no further. This relationship is illustrated in FIGURE 13.

Figure 12:
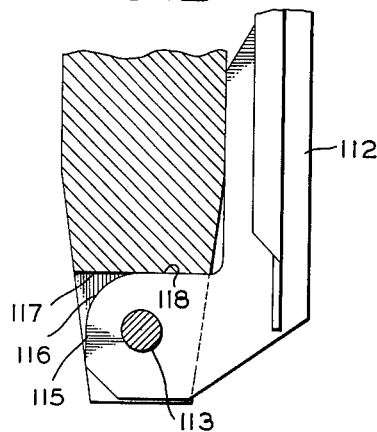
FIGURE 12 is an enlarged fragmentary sectional view showing the attachment of the flukes with the flukes in the retracted position.

In addition each fluke includes a flat edge 115 at the hinge area, which is substantially aligned with the axis of the projectile when the fluke is in the folded position of FIGURE 12. Upon rotation of the fluke, as permitted by rounded corner 116 adjacent the flat edge 115, the latter surface is brought into contact with transverse surface 117 at the inner end of the slot in the projectile where the flukes are mounted (see FIGURE 13). The surface 16 has a radius of generation approaching the distance from the axis of pin 113 to surface 117 to provide clearance for the rotational movement. The interengagement of surfaces 115 and 117 precludes rotation of the fluke beyond approximately ninety degrees.

It should be noted that the stop provided by surfaces 115 and 117 is on the opposite side of the hinge pin 113 from the roational limitation imposed by the contacting edges 114. The loads imposed tend to concel each other out, which reduces the force applied to the pin 113. In view of the necessity for the hinge pin to transmit the tension force from the cable to the flukes when the anchor is embedded, reduction of the net hinge load is a matter of importance in minimizing the possibility of failure of this element.

An additional advantage to the fluke construction, also relieving the load applied to the hinge pin, is found in the arrangement to accelerate the flukes along with the projectile. The acceleration forces are applied directly to the flukes and not transmitted through the hinge pin 113. This gives further assurance of reliable operation of the flukes upon embedment of the anchor. This is accomplished through the provision of flat edge surface 118 on the fluke end adjacent the hinge pin. Surface 118 extends transversely when the fluke is in the folded position of FIGURE 12, being alongside the inner wall 117 of the slot in the projectile.

As a result of this construction, the edge 118 is substantially normal to the stop surface 115 and connects to the opposite end of rounded corner 116. The edge 118 extends to the longitudinal axis of the projectile, which intersects hinge pin 113, and edges 118 and 115 are equidistant from the pivot axis. The corner 116, which describes an arc of approximately ninety degrees, is at no portion farther from the axis of the pin 113 than are the edges 115 and 118. This means that the corner will not interfere with the free rotation of the fluke.

When the explosive charge is detonated and the projectile is discharged from the barrel, acceleration forces are transmitted to the flukes across the surfaces 117 and 118. Hence, the flukes are loaded by the projectile and the hinge pin is not required to absorb full acceleration forces.

Figure 14:
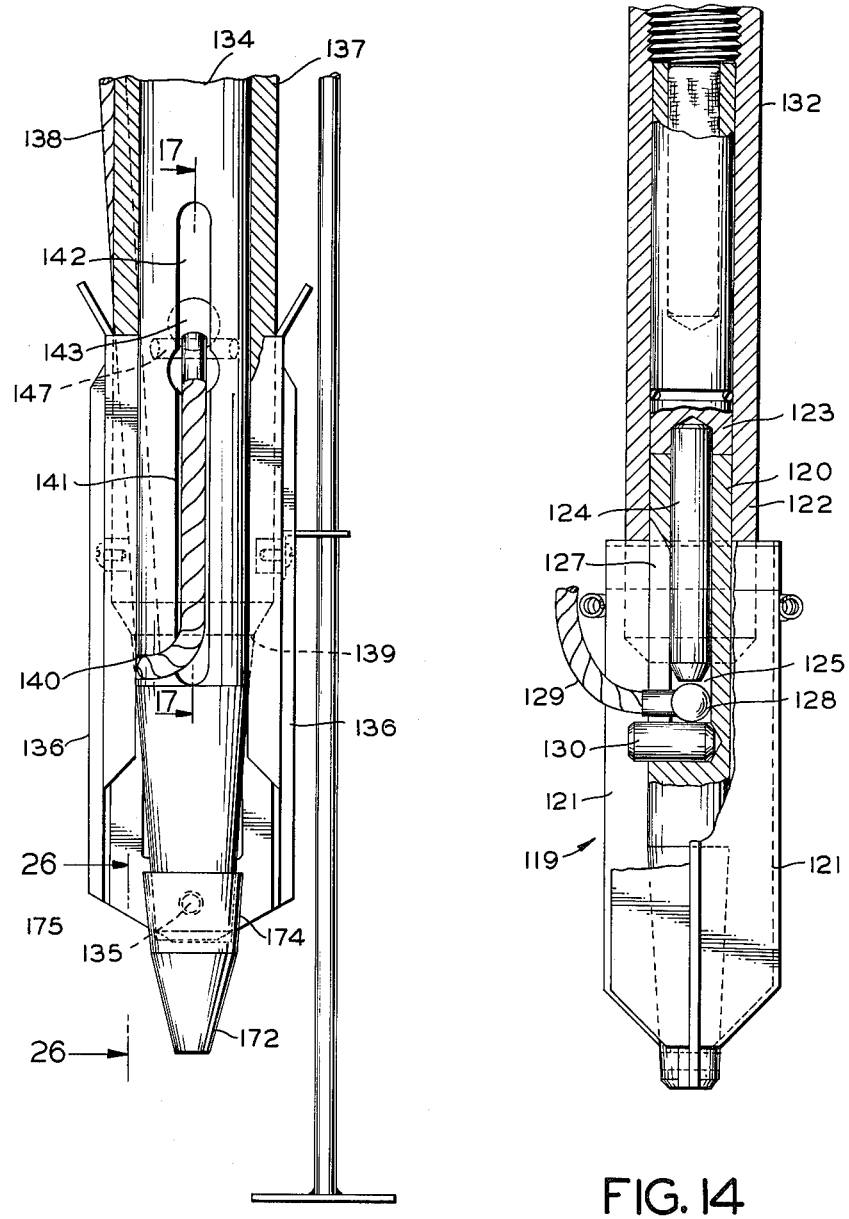
FIGURE 14 is a longitudinal sectional view showing a different form of the projectile assembly in which the projectile is in three units.
Figure 15:
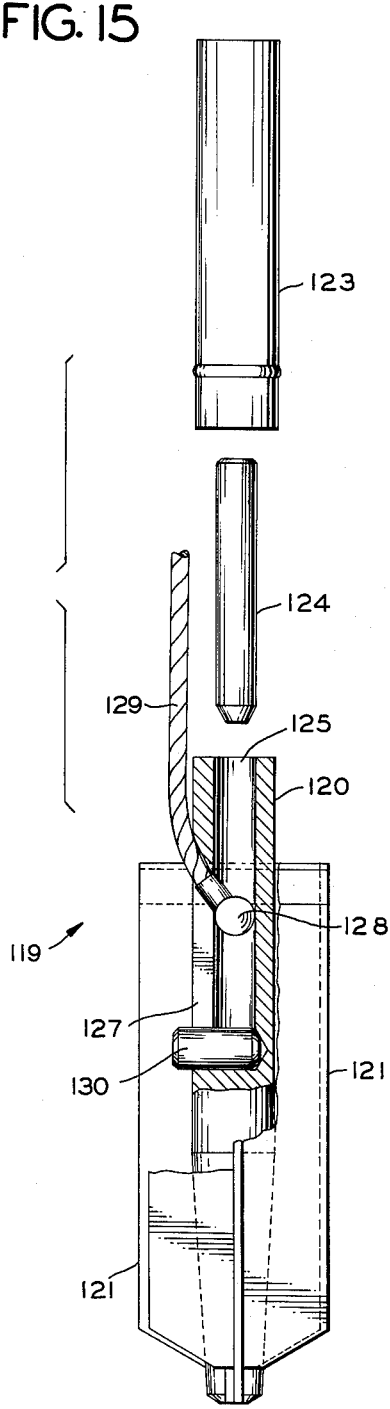
FIGURE 15 is an exploded view of the projectile of FIGURE 14.

The design of FIGURES 14 and 15 offers considerable advantage from several standpoints. This includes full protection of the anchor cable, and provision for causing the projectile to make a stroke of maximum length to make efficient utilization of the piopulsive forces, while retaining the necessary point of application of the tension force on the embedded anchor above the center of pressure.

Here the projectile assembly 119 is made in three sections. One of these is the lower anchor portion 120 that carries flukes 121, which may be similar to flukes 112 previously described. The upper end of the anchor portion 120 extends into barrel 122 where it is engaged by the end of the upper piston portion 123 of the projectile assembly. The projectile segments 120 and 123 are of substantially the same outside diameter. A bar 124 constitutes the third element of the projectile assembly, loosely fitting within an axial opening 125 that extends inwardly from the upper end of element 120. A more shallow axial recess in the bottom end of piston member 123 receives the upper end of the bar 124.

A longitudinal slot 127 is formed in the wall of the lower portion 120, comunicating with the axial opening 125. The ball end 128 of cable 129 is slidable within the axial opening 125, but is too large to slip out through the longitudinal slot 127. The ball end can be inserted into the axial opening 125 through a radially extending cylindrical enlargement at the bottom end of the axial opening and the longitudinal slot 127. A dowel pin 130 is driven into the cylindrical enlargement after the cable is in place assuring that the ball end 128 is trapped and cannot leave the axial opening 125. When the anchor is assembled, as shown in FIGURE 14, the ball is prevented from any substantial translational movement by the pin 130 and the lower end of bar 124, which are on either side of the ball. The dowel pin projects radially beyond the circumferential wall of the projectile, and is held in the cylindrical enlargement by frictional force.

When the explosive charge is detonated, the upper section 123 of the projectile assembly 119 acts as a piston in the usual manner, so that the explosive gases drive the projectile assembly downwardly. As this movement begins, the cylindrical bar 124 bears against the ball end 128 of the cable 129, causing the cable to commence its movement as soon as the projectile assembly is placed in motion. Hence, the cable and projectile begin to accelerate together. The advantage of this is that no portion of the cable receives a shock load by being suddenly jerked into motion after the projectile has had the opportunity to reach an appreciable velocity. In the previously described embodiments it was necessary for the projectile to be driven downwardly approximately the distance of the doubled over segment of the cable before the main portion of the cable actually would commence its movement. By this time the projectile will have received a considerable acceleration so that the resulting snap on the cable can cause it to break. For lighter designs where the projectile will be driven by less force the cable arrangement of FIGURES 4, 5 and 7 can be used satisfactorily. For such a smaller unit there is not as much likelihood of snapping the cable in two. However, for larger designs where a greater powder charge is necessitated for driving the fluked end of the projectile into the bottom, and for greatest assurance of reliability of operation under all circumstances, some provision for causing the cable to commence movement with the projectile is highly desirable in preventing possible breakage of the cable.

Once the projectile has left the barrel there is no force present to retain the upper and lower sections 123 and 120 of the projectile in a position where their radial end walls are in abutment. Therefore, when the anchor enters the bottom and the upward load is applied to the cable 129, the ball 128 then will be free to slide in the axial opening 125 to the upper end of the longitudinal slot 127. The bar 124 merely is shifted upwardly in the opening 125 as the ball moves in this manner. Hence, the cable applies its load to the upper end of the anchor unit 120 so that the flukes will open up and the anchor will be secured in the bottom.

This version of the projectile is made quite economically permitting use of standard components with a minimum of machining. It avoids costly cutting of grooves in the projectile to receive the doubled over portion of the cable as necessitated in the embodiments described above. It has the unique function of accomplishing an ultimate pull from the upper end of the anchor, while avoiding the need to double the cable over and insert its end into the barrel. At the same time the projectile moves through its full stroke, and the cable is not subjected to suddenly applied loads.

It should be noted that the piston portion 123 of the projectile assembly and the bar 124 could be made integral because they actually move together. For convenience and economy of construction they normally are made as separate parts as illustrated.

The inclusion of the dowel pin 130, which projects beyond the circumferential wall of the projectile section 120, is particularly advantageous where the anchor is to be driven into relatively hard substances. This is because the dowel pin enters the bottom ahead of the portion of the cable 129 that is adjacent the projectile. Hence, the pin 130 forms an opening in the bottom through which the cable can pass freely. This means that as the anchor is driven into the bottom, the cable does not contact the bottom material. This offers a further protection to the cable. The anchor enters the bottom at a considerable velocity due to the impetus of the explosive charge in the barrel. Where the bottom material is hard or abrasive there normally exists a hazard that the cable will become damaged or broken as it forces its way through such substance when the anchor penetrates. However, with the dowel pin projecting outwardly ahead of the cable creating an opening in the bottom as the anchor passes through, damaging contact between the cable and the bottom material is avoided.

The effectiveness of the projecting element 130 is assured by virtue of the fact that the cable always will be aligned with it. The slot 127 guides the cable and restricts its location to the zone immediately behind the pin 130. Therefore, the cable will be caused to enter the bottom through the opening that the projection 130 creates for it.

The unit of FIGURES 13 and 14 offers still another advantage in lengthening the stroke taken by the projectile within the barrel. This is accomplished by recessing the upper end of the projectile piston section 123 to receive the explosive charge 132. This means that the projectile can extend the entire length of the barrel, with no extra space left for the explosive. Therefore, the stroke of the projectile is increased by substantially the length of the charge 132, and the efficiency of utilization of the explosive gases is enhanced considerably.

Figure 17:
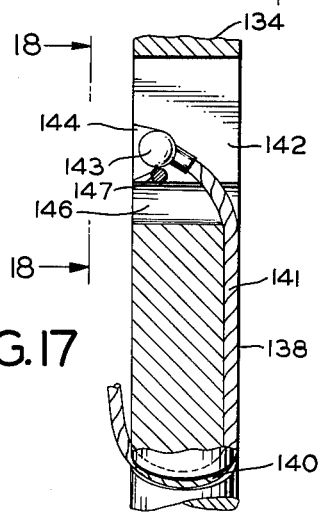
FIGURE 17 is a fragmentary sectional view taken at right angles to the illustration of FIGURE 16, showing the attachment of the cable to the projectile, and illustrating the groove for accelerating the cable with the projectile.
Figure 18:
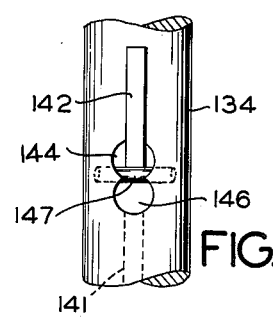
FIGURE 18 is a fragmentary side elevational view of the projectile of FIGURES 16 and 17 with the cable removed.

Another arrangement for the projectile and its attached cable may be seen by reference to FIGURES 16, 17 and 18. This construction also provides for the acceleration of the cable simultaneously with the projectile when the explosive charge is detonated. As illustrated, the projectile 134 pivotally carries about cross pin 135 a pair of flukes 136. The upper end of the projectile 134 is fitted into barrel 137 in the usual manner. Cable 138 extends from a housing (not shown) comparable to the container 104 previously described.

At a location immediately below the bottom end 139 of the barrel 137 the cable passes through arcuate groove 140 formed in the surface of the projectile 134. The groove 140 extends around a portion of the circumference of the projectile and curves upwardly to connect to a longitudinal groove 141. The end portion of the cable passes from groove 140 into the longitudinal groove 141, being thereby doubled over and extending inwardly of the barrel 137. A slot 142 intermediate the ends of the projectile passes diametrically through the projectile at the upper end of groove 141. The cable passes through the slot 142, and ball end 143 on the distal end of the cable fits within an enlarged recess 144 in the side of slot 142 opposite the groove 141.

In order to fit the ball end 143 into the recess 144 there is a diametrically extending enlarged portion 146 having opposite walls formed by cylindrical segments dimensioned to slidably receive the ball 143. Therefore, the ball is fed through the enlarged section 146 and then moved upwardly into the recess 144. At this time a pin 147 is passed through the projectile beneath the ball, preventing the ball from dropping downwardly into the enlarged portion 146. This assures that the end 143 will never shift back into the opening 146 and so become disconnected from the projectile. At the same time, it does not prevent the cable end from later sliding upwardly in slot 142 when the projectile has been discharged to embed the anchor.

When the projectile is fired, all portions of the cable will begin to move at once by virtue of the groove 140 below the end 139 of the barrel. This is because as the projectile moves downwardly the upper edge of the groove 140 bears against the loop of cable extending through it, causing this portion of the cable to accelerate along with the projectile. Hence, as soon as motion is imparted to the projectile, the cable 138 also starts to move and the cable is from the outset accelerated along with the projectile and fed downwardly of its retainer housing. Accordingly, sudden loads on the cable are avoided.

After the anchor is embedded in the bottom, the cable will move upwardly in the diametrical slot 142 and apply the tension load from the upper portion of the projectile. The cable end will leave the recess 140, moving upwardly so that the force will be applied to the proper portion of the projectile. With the cable pulling at the upper end, it will not tend to turn the projectile over, but will impose a substantially vertical force on it above the center of pressure, thereby enabling the flukes to open and secure the anchor in the bottom.

This version of the invention retains the feature of smooth acceleration of the cable, while allowing the projectile a full stroke in the barrel. While allowing the projectile to be a one piece unit, it requires more machining than the design of FIGURES 14 and 15 and the groove 140 is somewhat costly to form. The present embodiment also is not particularly adaptable to the use of an outward projection to form a cable opening in the bottom, such as the dowel pin 130.

Figure 20:
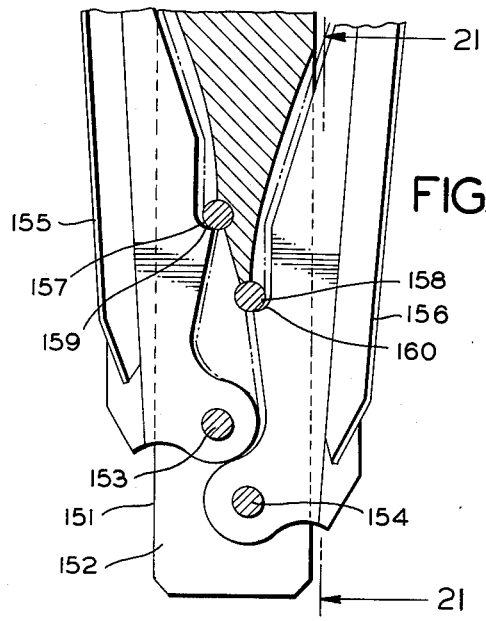
FIGURE 20 is an enlarged fragmentary sectional view illustrating the mounting of the flukes and their relationship to the drive pins.
Figure 21:
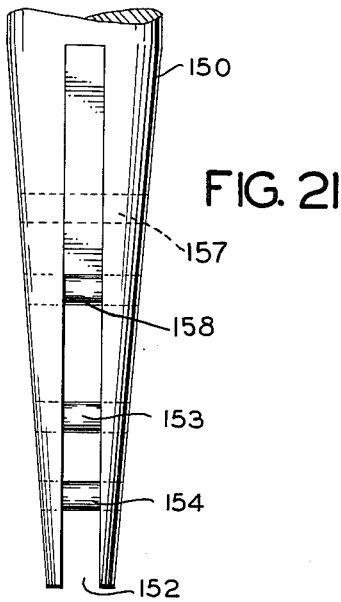
FIGURE 21 is a fragmentary side elevational view of the projectile of FIGURES 18 and 19 illustrating the drive and hinge pins, and with the flukes removed.
Figure 19:
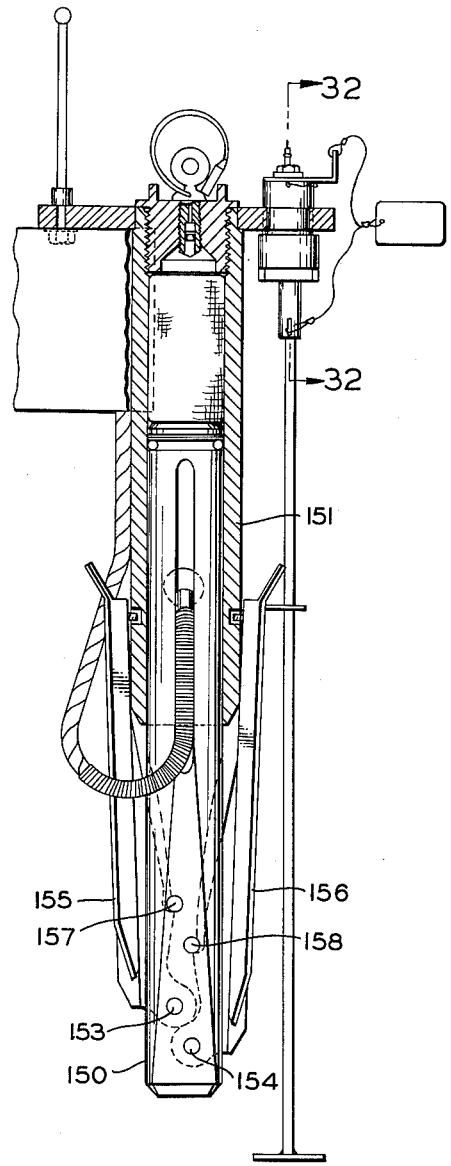
FIGURE 19 is a side elevational view, partially in section, showing a projectile utilizing transverse pins to drive the flukes.

A further variation in the invention may be seen in FIGURES 19, 20 and 21. Here the means for accelerating the flukes with the projectile, without relying upon the mounting pin that secures the flukes to the projectile, includes extra pins to engage shoulders on the flukes. In this arrangement the bottom end of the projectile 150, depending below barrel 151, is provided with an elongated upwardly extending longitudinal slot 152. Two cross pins 153 and 154 extend transversely of the slot 152 to serve as the pivot axes for the flukes 155 and 156. Two hinge pins are employed in this instance and the flukes are aligned with each other instead of being mounted side-by-side as before. These hinge pins are located on either side of the axis of the projectile and are quite close to it. The pin 153 is positioned slightly above the pin 154, providing clearance for the end portions of the flukes.

A similarly arranged pair of pins 157 and 158 likewise is carried by the projectile. These two pins are located axially inwardly of the pins 153 and 154, and are disposed immediately adjacent shoulders 159 and 160 on the flukes. Therefore, when the projectile 150 is moved by the explosion in the barrel, the pins 157 and 158 transmit the propulsive force to the flukes via the shoulders 159 and 160 of the flukes. These two cross pins 157 and 158, therefore, cause the flukes to be moved downwardly with the piston, and it is not necessary to rely upon the pivot pins 153 and 154 to overcome the inertia forces and accelerate the flukes along with the projectile 150.

It may be noted that when the unit is in its installed position the flukes 155 and 156 are not tight against the pins 157 and 158. That is to say, the inner surfaces of the flukes are spaced slightly outward of the adjacent projectile surfaces. This is because it is necessary for the flukes to overlap the barrel 151. However, as soon as the projectile has moved through a short increment of travel the upper ends of the flukes no longer are next to the barrel, and the flukes are free to move inwardly to the circumferential wall of the projectile 150. The hydrodynamic forces rapidly and easily fold the flukes inwardly this slight amount so that they lie alongside the circumferential wall of the projectile 150.

Figure 24:
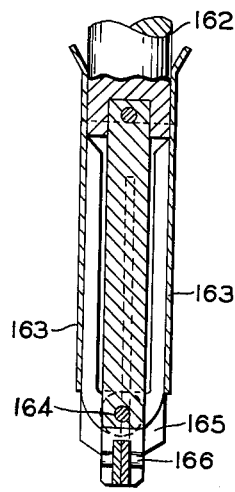
FIGURE 24 is a longitudinal sectional view taken along line 24—24 of FIGURE 23, further illustrating the fluke mounting.

For particularly large anchors such as those to withstand forces in the neighborhood of 50,000 pounds or more, the unit may be constructed as seen in FIGURES 22, 23 and 24. Here the projectile 162 is equipped with four flukes to provide a greater holding force in the ocean floor. This includes a pair 163 pivotal about one transverse pivot pin 164, while a second pair of flukes 165 rotate about pin 166. The latter pin is axially outward of and at right angles to the pin 164. Therefore, the flukes pivot in planes normal to each other.

In view of the magnitude of the forces involved in driving the larger anchor into the ocean floor, a different shear pin arrangement is employed. In this instance a screw 167 passes through an aperture in the barrel 168 to be received in the projectile 162. The connection of the shear pin to the projectile relieves the flukes of the high loads imposed upon the detonation of the explosive charge, thereby preventing damage to the flukes.

Also, in this version of the invention, the drag plate 169 is reinforced so that it may withstand the tremendous explosive forces reacting upwardly. This may be accomplished by the inclusion of inclined structural members 170 extending upwardly from the drag plate 169 and inwardly to connect to the upper portion of the projectile assembly. The members 170 are appropriately spaced about the periphery of the drag plate 169 in order to support all cantilevered sections of it. Accordingly, when the charge is detonated and the drag plate is driven upwardly, the members 170 resist in tension the forces tending to bend the drag plate downwardly.

Figure 25:
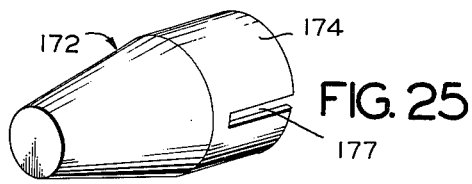
FIGURE 25 is a perspective view of the nose cone which can be attached to the end of the projectile.
Figure 26:
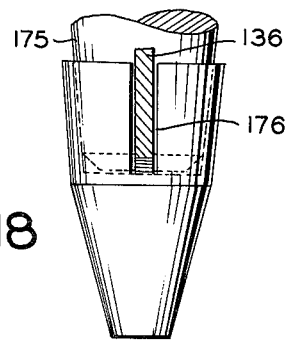
FIGURE 26 is a sectional view taken along line 26—26 of FIGURE 16 further illustrating the cone.

In order to effect penetration of particularly hard substances it is possible to provide a more pointed end for the lower portion of the projectile of any of the various anchors described above. Such a configuration is obtained readily by the simple attachment of a nose cone 172, such as illustrated in conjunction with the anchor of FIGURE 16, and also shown in FIGURES 25 and 26. The nose cone 172 is a substantially frustoconical member having a hollow upper portion 174 adapted to fit over the tapering lower end 175 of the projectile. Opposed slots 176 and 177 extend through the wall of the upper hollow portion 174 of the nose cone, permitting clearance for the flukes 136. The nose cone 172 may be constructed so that it is simply slipped over the end 174 of the projectile and tapped into place with a hammer, being adequately held by a frictional force when this is done.

While the cone 172 renders the projectile sharper than otherwise, normally its use is of somewhat limited scope. The cone inherently increases the width of the projectile because it is fitted over the exterior of the projectile when attached. Therefore, it causes the formation of a larger opening in the ocean bottom than otherwise would be the case. This bigger aperture can reduce the holding power of the anchor. Accordingly, in view of this and the expense of the cone 172, its use generally is restricted to specialized situations.

The fuze assembly which detonates the explosive charge for driving the anchor into the bottom also may be tailored to suit particular circumstances, and to assure complete reliability of operation under all conditions. As seen in FIGURE 27, fuze assembly 93 is carried by the drag plate 90 although, of course, it may be associated with any of the other drag plates previously described. The fuze unit includes a cylindrical housing section 181 which is threadably received in an aperture in the drag plate 90. An end cap 182 is threaded onto the lower end of the cylindrical member 181 being sealed with respect to the cylindrical member by a substantially cup-shaped member 183 at this end of the assembly 180. Normally the member 183 will be made of a suitable elastomer such as rubber. The upper end of the member 183 supports battery 184 within the cylindrical member 181. A disc 185 is retained within the cup-shaped member 183, spaced beneath battery 184.

A relatively short tubular member 187 is threaded axially into the center of the end cap 182. The bottom end of the tubular member 187 slidably receives the upper end of actuating rod 99. This is the rod that is adapted to engage the floor of the body of water when the unit is lowered. A transversely extending guide pin 188 projects from either side of the upper end of rod 99 and into opposed longitudinal slots 189 and 190 of the member 187. A compression spring 191 is received in tubular member 187, being interposed between the end of the cup-shaped member 183 and the pin 188. Hence, it can be seen that the spring 191 normally biases the rod 99 to a lowered position where the pin 188 rests on the bottom edges of the slots 189 and 190. However, the rod 99 may be moved upwardly in opposition to the spring 191 as the pin 188 slides within the slots.

Axially projecting from the upper end of the rod 99 is a slender pin 193. This pin passes through an axial opening in the member 183 which, by virtue of its elastomeric properties, forms a watertight seal around the pin. The pin 193 also extends into an opening formed in the disc 185.

At the upper end of the fuze assembly 180 is an elastomeric end cap 194 which grips the cylindrical body member 181 by virtue of a bead 195 extending into an annular recess in the upper circumferential wall of the member 181. A rigid sleeve 196 fits around the periphery of the member 194.

The upper wall 198 of member 194 is dome-shaped, forming a diaphragm that in its free position projects outwardly in a spaced relationship with the end of the member 181. Extending into this wall is a pin 199. A connector 200 sealingly fastens onto the axially projecting segment 201 of the end wall 198, and includes an electrical conductor 101 that connects to pin 199. The conductor extends to squib 203 located above the cartridge 96 at the breech 95 of the projectile portion of the unit.

The pins 193 and 199 normally are maintained in a spaced relationship with the end surfaces of the battery 184. For the pin 199 there is provided a U-shaped safety lock 205 that fits over the end wall of the rigid sleeve 196 and beneath the undercut defined by flange 206 of the end wall 198 of the member 194. Pin 193 is held in the position of FIGURE 27 by means of a locking pin 207 that passes through an aperture in the lower portion of the tubular member 187 and in the rod 99 adjacent the upper end of the rod. For convenience and to give assurance of proper operation, flexible element 208 extends between the safety locks 205 and 207.

Figure 30:
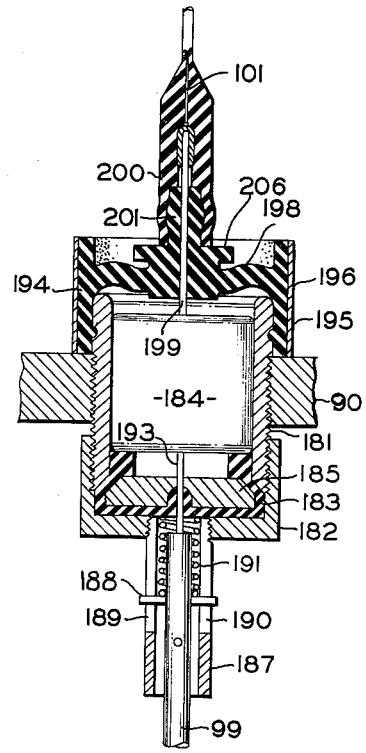
FIGURE 30 is a fragmentary longitudinal sectional view showing the fuze of FIGURE 27, with the circuit closed for firing the explosive charge.
Figure 29:
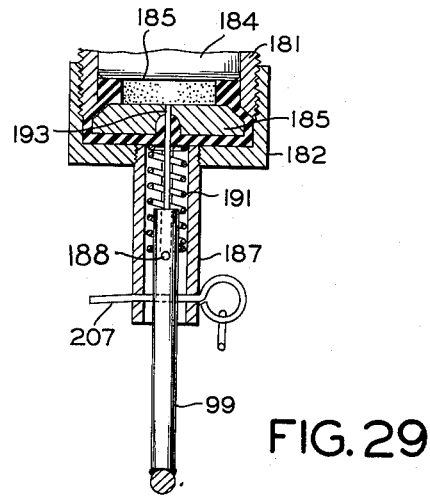
FIGURE 29 is a longitudinal sectional view taken along line 29—29 of FIGURE 27, showing the safety arrangement for the lower portion of the fuze.
Figure 28:
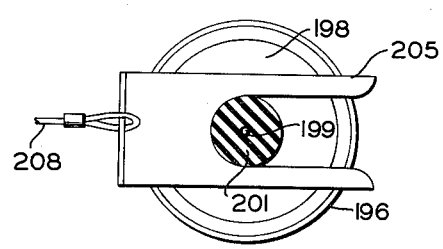
FIGURE 28 is a sectional view taken along line 28—28 of FIGURE 27, illustrating the safety lock of the upper portion of the fuze assembly.

In operation of the unit, therefore, at the time when the anchor is to be lowered into the water the safety members 205 and 207 are removed. Then as the unit starts its downward path the pressure of the water will begin to bear against the dome-shaped end wall 198. At a predetermined depth such as, for example, ten feet, the force of the water pressure will be sufficient to collapse the end wall 198 inwardly so that it assumes the position shown in FIGURE 30. When this occurs the pin 199 is brought into electrically conductive relationship with the upper end of the battery 184. The lowering of the anchor will continue until such time as the rod 99 finally strikes the bottom. The weight of the unit will cause the rod 99 to move upwardly in opposition to the force of the spring 191. This movement continues until the pin 193 engages the lower end of the battery 184. When this occurs the circuit is complete to the squib 203 and the explosive charge 96 is detonated.

A simple electrical diagram for this may be seen by reference to FIGURE 31. The pins 193 and 199 connect to the positive and negative terminals of the battery, being in series with the squib so that the electrical charge appropriately causes the squib to explode the cartridge 96.

This construction of the fuze assembly results in a unit of complete reliability yet of basic simplicity in construction and assembly. A positive seal is effected at either end of the unit so that it is assured that water cannot leak into the interior around the battery. At the same time it is possible to construct the unit so that the arming and detonation occur at exactly the proper times. The upper wall 198 of the unit is readily constructed to collapse inwardly under water pressure only when the assembly has been lowered to an established depth. Consequently, the unit will not be armed too soon as it is dropped downwardly toward the bottom of the body of water.

Another arrangement for the fuze assembly may be seen by reference to FIGURE 32. Here there is included a cylindrical member 210 threadably connected to the drag plate 90. The lower end member 211 fits over the bottom end of the body member 210, being sealed with respect to it by an annular member 212. Battery 184 is received within member 210, resting upon the annular sealing element 212.

The end member 211 threadably receives sleeve 187 at its axis, and rod 99 with the transversely extending guide pin 188 extends into the tube 187 as described above. At the upper end of the opening that receives the tube 187, the end member 211 complementarily receives a seal 213. This member has a conical upper surface that connects to a short cylindrical portion adjacent the tube 187. A small axial opening is formed through the seal 213 and the wall of member 211. Pin 193 passes through these openings in a watertight relationship with seal 213.

At the upper end of cylindrical body member 210 is a piston 214 sealed with respect to the inner wall of member 210 by an O-ring 215. A fitting 216 threads into the upper end of the piston 214 and carries a pin 217 that projects slightly beyond the lower end wall of the piston 214. The pin 217 corresponds to the pin 199 previously described and, hence, through an electrical conductor connects to the squib that is associated with the explosive charge.

In operation of this version of the fuze assembly, the fuze is armed by the hydraulic force reacting against the outer surface of the piston 214. At a readily calculated pressure corresponding to a predetermined depth the piston 214 will be caused to shift downwardly in the cylindrical body 210. The movement will progress until the pin 217 contacts the upper end of the battery 184, thereby closing the circuit on one side of the battery to the squib and arming the fuze. The fact that pin 217 depends only slightly beyond the lower piston surface means that the pin will be bent only a limited amount when the piston has completed its stroke. This protects pin 217 from damage and assures that the electrical contact is maintained.

Subsequently when the rod 99 strikes the bottom, it will move upwardly against the force of the compression spring 191. The rod will move upwardly until the pin 193 is brought into engagement with the lower end of the battery 184, whereby electrical current passes from the battery to the squib and the unit fires.

While the invention has been illustrated as incorporating a fuze assembly it is not necessary to include that element where the situation warrants its omission. In such instances the electrical connection to the squib may be made through wires extending to the surface of the body of water, with the switch manually operated. This allows the anchor to be positioned with precision prior to explosion of the charge, and means that it can be assured that the anchor will not strike any submerged object that should be avoided. In such instances the anchor will be placed in position by a diver prior to detonation.

Moreover, it is possible also to omit the flukes themselves where the projectile is to be driven into a particularly hard substance such as a mass of concrete. With the flukes removed the projectile will have less frontal area and will penetrate more readily, yet will be held securely within the mass my frictional force.

The foregoing detailed description is to be clearly understood as given by way of illustration and example only, the spirit and scope of this invention being limited solely by the appended claims.

I claim:
1. An exposive-operated anchor apparatus, which comprises
 an outer assembly,
 an inner assembly at least partially telescoped into said outer assembly and adapted to be explosively propelled therefrom into the floor of a body of water,
  said inner assembly including fluke means to resist withdrawal of said inner assembly from said floor,
 first flexible filament means, connector means for connecting said first flexible filament means to said inner assembly and for interconnecting said inner assembly and a vessel independently of said outer assembly,
 second flexible filament means to connect said outer assembly to said vessel independently of said inner assembly and of said first filament means,
  whereby said outer assembly may be recovered after projection of said inner assembly therefrom,
 a fuze and explosive means incorporated in said outer assembly to explosively propel said inner assembly therefrom upon contact of the anchor apparatus with said floor,
  said fuze and explosive means incorporating safety means to prevent detonation of the explosive at less than a predetermined depth below the surface of said body of water, said connector means including means for progressively accelerating said first flexible filament means with said inner assembly upon such propulsion of said inner assembly for precluding imposition of shock loads on said first filament means.
2. The invention as claimed in claim 1, in which said fuze and explosive means includes
 a squib, electric circuit means connected to said squib to effect electrical actuation thereof, first and second switch means incorporated in said circuit means to operate the same, means to operate said first switch means in response to water pressure, and means to operate said second switch means in response to engagement of the anchor apparatus with said floor.

3. An explosive anchor assembly, comprising an elongated outer barrel member having a mouth, an elongated inner piston member telescoped at least a substantial distance into said barrel member, said piston member having fluke means thereon to resist withdrawal from the floor of a body of water, explosive means to propel said piston member out of said barrel member and into said floor, said fluke means being laterally extensible upon penetration of said piston member into said floor in response to the discharge of said piston into said floor, and cable means to join said piston member to a vessel floating on said body of water, said piston means including connector means connecting one end portion of said cable means to said piston member, said connector means including means for progressively and evenly accelerating said cable means with said piston member upon said propulsion of said piston member out of said barrel by said explosive means for thereby protecting said cable means from shock loads.

4. The invention as claimed in claim 3, in which protector means are provided around said one end portion of said cable means to protect the same from damage upon explosive projection of said piston member out of said barrel member.

5. The invention as claimed in claim 3, in which a substantial length of said cable means adjacent said one end portion thereof is mounted in shortened relationship between said fluke means and said barrel member.

6. An explosive anchor apparatus, comprising an outer assembly having an elongated barrel portion, an inner assembly having an elongated piston portion telescoped into said barrel portion, said inner assembly also having a plurality of flukes pivotally connected thereto at points located outwardly from the mouth of said barrel portion, flexible cable means connected to said piston portion and adapted to be connected to an object which it is desired to anchor in a body of water, a substantial length of said cable means being mounted in shortened relationship between said flukes and said barrel portion and adapted to be lengthened upon projection of said piston portion from said barrel portion, means to connect said flukes to said outer assembly and to maintain said flukes in pivoted positions adjacent said barrel portion, and explosive means to project said piston portion from said barrel portion and effect cessation of operation of said last-named means.

7. The invention as claimed in claim 6, in which said flukes have planing sections shaped to maintain said flukes adjacent said barrel portion in response to explosive projection of said inner assembly through the water and into the floor of said body of water, and also shaped to pivot said flukes to operative positions transverse to said piston portion in response to pulling on said cable means after said inner assembly is embedded in said floor.

8. The invention as claimed in claim 6, in which said piston portion has a longitudinal groove therein adapted to receive the end section of said cable means, and in which means are provided to pivotally connect the end of said cable means to said piston portion at a point which is telescoped within said barrel portion, whereby the end section of said cable means extends along said groove longitudinally of said barrel portion and out the mouth thereof.

9. The invention as claimed in claim 8, in which short cables are disposed in said groove beneath said end cable section, said short cables each being associated at one end with one of said flukes and at the other end with said piston portion in such manner that said flukes remain in operative positions transverse to said piston portion despite pulling on said cable means.

10. An explosive anchor apparatus, which comprises an elongated barrel having a mouth at one end thereof, an elongated piston telescoped into said barrel and having one end extending out said mouth, a plurality of flukes pivotally connected to said one end of said piston on opposite sides thereof, a flexible cable pivotally connected to said piston at a point which is located within said barrel and is spaced a substantial distance inwardly from said mouth, said cable extending longitudinally of said piston in a longitudinal groove therein and bending away from said piston at a point relatively adjacent said mouth, a substantial length of said cable being flaked between said flukes and said barrel to provide slack permitting explosive projection of said piston from said barrel, means extending through said flukes and into said barrel to maintain said flukes adjacent said barrel and thus secure said flaked cable portion between said flukes and said barrel, said last-named means being adapted to be sheared upon explosive propulsion of said piston from said barrel, and explosive and fuze means to explosively project said piston from said barrel in response to engagement of the anchor apparatus with the floor of a body of water.

11. The invention as claimed in claim 10, in which a length of said cable is flaked in a compressed sinusoidal manner between one of said flukes and said barrel, and is then extended to the lower end of a fluke on the opposite side of said barrel and is flaked between said opposite fluke and said barrel in compressed sinusoidal manner.

12. The invention as claimed in claim 11, in which said groove in said piston is disposed in a plane between the two planes in which said cable is flaked, said groove being maintained in said plane by the connections between said flukes and said barrel and until explosive projection of said piston from said barrel, 13. The invention as claimed in claim 10, in which a drag plate is mounted transversely to said barrel at the end thereof remote from said mouth, said drag plate creating reactive forces preventing substantial movement of said barrel upon projection of said piston therefrom.

14. The invention as claimed in claim 13, in which a fuze assembly is mounted adjacent said barrel through an opening in said drag plate, said fuze assembly including means to prevent explosive projection of said piston until the apparatus is at least a predetermined distance beneath the surface of said body of water, and in which means are provided to initiate operation of said fuze assembly in response to engagement of the apparatus with said floor of said body of water,
   said means including a firing rod disposed longitudinally of said barrel and extending to a point beneath said one end of said piston.

15. The invention as claimed in claim 10, in which a line is directly connected between the end of said barrel remote from said mouth and a vessel which it is desired to anchor,
   said line and said cable being substantailly coextensive,
   said line permitting retrieval of said barrel and the associated apparatus after projection of said piston into said floor of said body of water.

16. An embedment anchor comprising
a barrel,
an explosive charge in said barrel,
a projectile having an end extending into said barrel for discharge away from said barrel by said explosive charge,
fluke means carried by said projectile outwardly of said barrel,
   said fluke means being laterally extensible upon penetration of said projectile into a substance in response to the discharge of said projectile by said explosive charge,
      whereby said fluke means resists withdrawal of said projectile from said substance,
a flexible filament means connected to said projectile,
and means for causing said filament to accelerate substantially simultaneously and progressively with said projectile upon such discharge of said projectile.

17. An explosive anchor comprising
a barrel,
a projectile received in said barrel and extending outwardly from one end thereof,
an explosive charge in said barrel for driving said projectile away from said barrel,
a plurality of flukes,
means mounting said flukes on said projectile
   for permitting said flukes to assume a first position of adjacency with said projectile,
   and a second position in which said flukes project laterally outward of said projectile for holding said projectile in a substance in which said projectile is embedded,
means for normally holding said projectile in said barrel and releasing said projectile upon the exertion of a predetermined force by said explosive charge, said flukes being laterally extensible from said first position to said second position upon penetration of said projectile into a substance in response to the discharge of said projectile by said explosive charge,
a flexible filamentous member,
and means for attaching said filamentous member to said projectile
   such that said filamentous member accelerates progressively and evenly with said projectile when said projectile is so driven by said explosive charge.

18. A device as recited in claim 17 in which said means for attaching said filamentous member includes
movable means rigidly holding said cable relatively adjacent said flukes when said projectile is so received in said barrel,
   and movable to a position relatively remote from said flukes when said projectile has been driven away from said barrel,
      for causing a force exerted on said filamentous member to be transmitted to said projectile at said relatively remote position.

19. A device as recited in claim 17 in which
the end of said projectile inwardly of said barrel is recessed,
   said explosive charge being disposed substantially within said recess.

20. A device as recited in claim 17 including in addition a housing,
   said housing having an open side adjacent said flukes,
   said filamentous member having a substantial length
   said filamentous member having a substantial length thereof received in said housing
      and wound progressively in a figure eight pattern therein.

21. A device as recited in claim 17 including in addition a drag plate connected to said barrel
   and extending transversely thereof at a location remote from said one end thereof.

22. A device as recited in claim 21 including in addition a second filamentous member attached to said barrel and drag plate for retrieving said barrel and drag plate subsequent to said driving of said projectile away from said barrel.

23. A device as recited in claim 22 including in addition fuze means for causing detonation of said explosive charge,
   said fuze means being sensitive to and operable upon the positioning of said barrel adjacent the bottom of a body of water.

24. A device as recited in claim 23 including in addition means rendering said fuze means inoperative above a predetermined depth of said fuze means in a body of water.

25. A device as recited in claim 23 in which for causing said fuze means to be sensitive to and operable upon the positioning of said barrel adjacent said bottom, said fuze means includes
a depending member extending below said barrel and projectile
   for contact with the bottom ahead of said barrel and projectile when said barrel and projectile are lowered into a body of water.

26. An embedment anchor comprising
a barrel,
an explosive charge in said barrel,
a projectile having an end portion extending into said barrel for discharge away from said barrel by said explosive charge,
a plurality of flukes carried by said projectile outwardly of said barrel,
means for mounting said flukes for pivotal movement from a first position adjacent said projectile to a second position substantially at right angles thereto, said flukes being extensible laterally from said first position to said second position upon penetration of said projectile into a substance in response to the discharge of said projectile by said explosive charge,
a flexible filament means connected to said projectile,
and means for causing said filament means to accelerate substantially simultaneously with said projectile upon said discharge of said projectile.

27. A device as recited in claim 26 in which said projectile includes
an opening in said end position,
   said explosive charge being disposed within said opening.

28. A device as recited in claim 27 in which
one end portion of said flexible filament means extends inwardly of said barrel for said connection to said projectile at said end portion of said projectile,
   said projectile being recessed to receive said end portion of said filament means,
said means for accelerating said filament means with said projectile including an abutment surface on said projectile engaging said filament means for moving said filament means therewith.

29. A device as recited in claim 28 in which for said abutment surface said projectile is provided with a groove extending around a portion of the circumference thereof outwardly of said barrel,
  a portion of said filament being received in said groove for movement of said portion by the wall of said groove upon said discharge of said projectile.

30. A device as recited in claim 26 in which said connection of said filament means to said projectile is located outwardly of said barrel,
and said means for accelerating said filament means with said projectile includes
  a member in juxtaposition with said filament means on the side thereof adjacent said end of said projectile
    for driving said filament means with said projectile,
  said member being movable away from said filament means after said projectile has been discharged from said barrel,
  said filament means being movable toward said end of said projectile upon said discharge of said projectile,
    whereby a tensile force exerted on said filament means is transmitted to said projectile relatively close to said end of said projectile.

31. A device as recited in claim 26 in which said projectile includes a protuberance extending laterally therefrom outwardly of said barrel,
  and substantially in alignment with adjacent portions of said filamentous means,
    for providing an opening in the medium into which said projectile is driven upon detonation of said charge.

32. A device as recited in claim 26 in which said projectile includes a first portion extending outwardly of said barrel carrying said flukes,
and a second portion inwardly of said barrel in end-to-end relationship with said first portion,
  said first portion including a longitudinal slot extending radially inwardly thereof,
  and an axial opening communicating with said slot,
    said axial opening being of greater lateral dimension than that of said slot,
  said filament means extending through said longitudinal slot
  and having an enlarged end element slidably received in said axial opening,
    said enlarged end element being of a dimension whereby it cannot pass through said longitudinal slot,
  said second projectile portion including an extension slidably received in said axial opening and terminating at an end adjacent said enlarged end portion,
    whereby said second portion of said projectile maintains said enlarged end portion at portion of said slot relatively remote from said barrel and drives said cable with said projectile upon discharge of said projectile.
    while permitting said cable to slide upwardly in said slot when said projectile has been driven from said barrel.

33. A device as recited in claim 32 including in addition
  a member projecting radially outward from said barrel in axial alignment with said slot
  and on the side of said enlarged end portion remote from said barrel,
    whereby said member forms an opening in a substance receiving said projectile through which said filament means passes.

34. A device as recited in claim 26 in which said means for pivotally mounting said flukes includes
  transverse pin means,
  and including in addition means independently of said pin means for transmitting acceleration forces from said projectile to said flukes upon said discharge of said projectile, 35. A device as recited in claim 26 in which said means for mounting said flukes includes
  a transverse pin means,
    each fluke being rotatable about the axis of said pin means,
    each fluke including a first abutment surface and a second abutment surface,
      said surfaces being substantially equally spaced from said axis,
    each fluke including a third surface interconnecting said abutment surfaces,
      said third surface being spaced from said axis at all points thereof a distance no greater than said substantially equal space,
      the ends of said interconnecting surface being spaced apart by an arc about said axis substantially equal to said predetermined arc,
    said projectile having an abutment surface adjacent said first abutment surface of said fluke when said fluke is in said first position,
      and spaced from said axis substantially the same amount as the spacing therefrom of said first and second abutment surfaces.

36. A device as recited in claim 26 in which said means for pivotally mounting said flukes includes
  recess means in the end portion of said projectile,
  a transverse pin extending across said recess means,
    each of said flukes including a hinge portion having an aperture receiving said pin,
      whereby said flukes are mounted in a side-by-side relationship within said recess means,
    said flukes having surfaces brought into inter engagement upon rotation of said flukes through a predetermined arc from said first position to limit the rotation of said flukes at said second position, said projectile and flukes having inter-engaging abutment surface means for transmitting acceleration forces directly from said projectile to said flukes independent of said transverse pin upon said discharge of said projectile and prior to said rotation of said flukes.

37. A device as recited in claim 36 in which said recess means includes
  an inner transverse wall,
    each of said flukes including a second surface brought into engagement with said transverse wall upon rotation of the flukes through said predetermined arc.

38. A device as recited in claim 37 in which each of said flukes adjacent said transverse pin includes
  an end portion having a first substantially flat abutment surface
    substantially aligned and in juxtaposition with said transverse end wall of said recess when said flukes are in said first position,
  a second substantially flat abutment surface
    substantially at right angles to said first substantially flat surface,
  and a rounded corner interconnecting said substantially flat abutment surfaces.

39. A device as recited in claim 26 in which said filamentous means comprises
  a flexible cable,
  and including in addition an open-bottomed container receiving asid cable,
    said container having rounded opposite end walls,
    and said cable being wound back and forth within said container in a figure eight pattern,
      with adjacent turns located one above the other.

40. A device as recited in claim 26 including in addition
    a transversely extending plate at the upper end portion of said barrel,
        for acting as a resistance means for maintaining said barrel in a substantially vertical position during the lowering of said barrel into a body of water,
        and for absorbing reaction forces upon detonation of said explosive charge.

41. A device as recited in claim 40 including in addition
    tension members secured at one end to said barrel
        and inclined outwardly therefrom
        and attached at spaced locations about the periphery of said plate.

42. A device as recited in claim 26 in which
    there are four of said flukes,
        two of said flukes being pivotal about a first transverse axis,
        and the other two of said flukes being pivotal about a second transverse axis substantially at right angles to said first axis.

43. A device as recited in claim 26 including in addition
    means sensitive to contact with the bottom of a body of water for detonating said explosive charge.

44. A device as recited in claim 43 in which said means sensitive to contact with the bottom of a body of water includes
    a housing,
    electrical energy means within said housing,
    a squib adjacent said explosive charge,
    a first electrical contact,
    pressure-responsive means carrying said first electrical contact,
        and movable under a predetermined exterior fluid pressure to move said first contact into electrically conductive relationship with one terminal of said electrical energy means,
    a second contact,
    depending means carrying said second electrical contact,
        said depending means being engageable with the bottom of the body of water
            for moving said second contact into electrically conductive relationship with the other terminal of said electrical energy means,
            for thereby completing the electrical circuit to said squib and causing said squib to detonate said explosive charge.

References Cited by the Examiner

UNITED STATES PATENTS

| | | | |
|---|---|---|---|
| 651,724 | 6/00 | Peterson | 114—208 |
| 1,086,053 | 2/14 | Howell. | |
| 1,563,494 | 5/25 | Henkes | 102—90 |
| 1,675,118 | 6/28 | Lucas | 102—70 |
| 2,583,965 | 1/52 | Page et al. | |
| 2,738,145 | 3/56 | Taylor | 242—163 |
| 2,895,210 | 7/59 | Hubbard | 28—21 X |
| 2,943,572 | 7/60 | Flett | 102—70 |
| 2,961,955 | 11/60 | Macdonald | 102—7 |
| 2,993,461 | 7/61 | Feiler | 114—206 |
| 3,018,752 | 1/62 | Sorrell | 114—206 |
| 3,054,123 | 9/62 | Moeller | 114—206 X |
| 3,154,042 | 10/64 | Thomason et al. | 114—206 |

MILTON BUCHLER, *Primary Examiner.*

FERGUS S. MIDDLETON, *Examiner.*